(12) United States Patent
Khan et al.

(10) Patent No.: US 7,058,904 B1
(45) Date of Patent: Jun. 6, 2006

(54) OPERATING METHOD FOR MINIATURE COMPUTING DEVICES

(75) Inventors: Soudy M. Khan, Palo Alto, CA (US); James J. Leftwich, Palo Alto, CA (US)

(73) Assignee: Akceil Inc., Palo Alto, CA (US)

( * ) Notice: Subject to any disclaimer, the term of this patent is extended or adjusted under 35 U.S.C. 154(b) by 776 days.

(21) Appl. No.: 10/229,860

(22) Filed: Aug. 27, 2002

Related U.S. Application Data

(60) Provisional application No. 60/315,294, filed on Aug. 27, 2001.

(51) Int. Cl.
*G06F 13/00* (2006.01)

(52) U.S. Cl. .................. 715/840; 715/822; 715/841

(58) Field of Classification Search .............. 715/840, 715/841, 822, 809
See application file for complete search history.

(56) References Cited

U.S. PATENT DOCUMENTS

| | | | |
|---|---|---|---|
| 5,563,631 A | 10/1996 | Masunaga | |
| 5,634,102 A * | 5/1997 | Capps | ............ 715/744 |
| 5,825,353 A | 10/1998 | Will | |
| 5,859,628 A | 1/1999 | Ross et al. | |
| 6,104,334 A | 8/2000 | Allport | |
| 6,201,554 B1 | 3/2001 | Lands | |
| 6,269,361 B1 | 7/2001 | Davis et al. | |
| 6,282,082 B1 | 8/2001 | Armitage et al. | |
| 6,297,795 B1 | 10/2001 | Kato et al. | |
| 6,300,946 B1 * | 10/2001 | Lincke et al. | ............ 715/700 |

\* cited by examiner

*Primary Examiner*—Cao (Kevin) Nguyen
(74) *Attorney, Agent, or Firm*—Donn K. Harms

(57) ABSTRACT

A method for the easy input and operation of miniature computing devices which allows for a plurality of input functions using only two buttons in a method of contextual navigation. The two buttons provide four different input functions which are continually graphically displayed upon the computing device display such that the user can always discern the action that will occur when one or both buttons are depressed. Different functions occur with the pressing of each one of the buttons yielding two functions whereas pressing both buttons for a short period yields a third function and both buttons for a longer period a fourth function. Additional utility is provided through the use of voice commands that may be communicated and stored in the computing device with associated data which will be displayed upon subsequent communication of the same voice command. A third button facilitates the entering and retrieval of voice command related data.

10 Claims, 4 Drawing Sheets

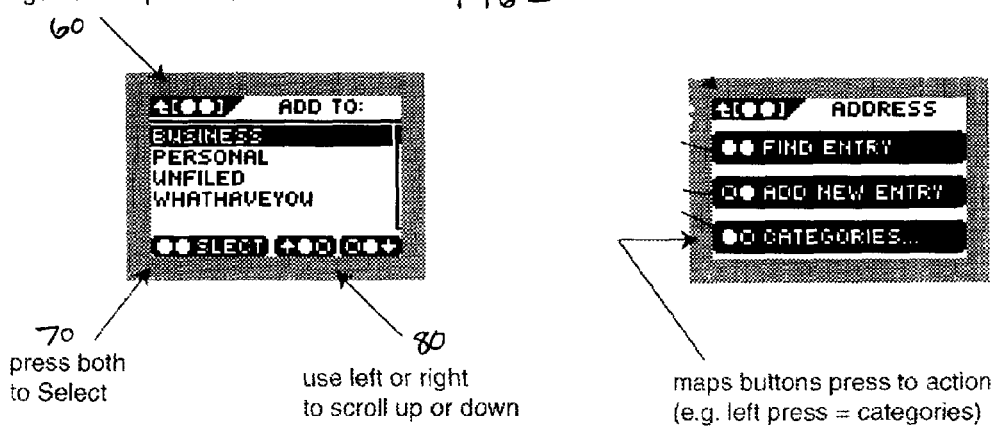

OPERATING METHOD FOR MINIATURE COMPUTING DEVICES

BACKGROUND OF THE INVENTION

I. Field of the Invention

This application claims the benefit of U.S. Provisional Application No. 60/315,294 filed Aug. 27, 2001.

This invention relates to the operation of miniature computing devices such as personal digital assistants, watches, and other small form factor computing devices whose miniature form provides limited space for providing input means. In particular, this invention discloses a simple contextual navigation operating method for controlling data entry and display on miniature computing devices which requires a minimal number of buttons to accomplish a plurality of input and display operations. Using a unique combination of only two finger operated buttons along with an optional but preferred voice input button, the user is presented with an easy navigation and input system for a small or miniature computing device which eliminates the need for keyboards and stylus-based entry which grow ever more cumbersome as the size of computing devices decrease.

II. Description of the Related Art

Handheld and other miniature computing devices represent one of the fastest growing sectors of the electronics industry. IDC predicts the demand for smart handheld devices alone will grow from 12.9 million units in 2000 to over 63.4 million by 2004, creating a worldwide market worth more than $26 billion. Automobile industry experts predict 50% of the 50 million vehicles produced each year will have in-vehicle telematics and multimedia systems by 2005. Further, as an example, more than 5 million U.S. consumers carry miniature computing devices secured to their key chains which communicate with computers at gasoline service stations in order to speed up transaction times and take advantage of promotions.

The field of miniature computing device includes wrist-based computers, small cellular phones, and next generation car keys—almost any micro-miniature computing device that requires user interaction and the ability to run multiple applications. However, unlike desktop and even laptop computers, miniature computer devices have very limited space in which to present data and to receive input from the user. Further, with the continued shrinking of computing devices and increases in the memory carried by such devices, a computer the size of a wristwatch or car key with the computing power of a desktop computer is already a reality. However, as computing devices shrink, and memory and processing in such devices grows, the input, retrieval, and display of data is becoming a vexing problem.

Prior art attempts at solving this problem have included miniature keyboards and stylus based handwriting recognition. However, neither of these solutions is amendable to smaller form factor devices. Keyboards need to be large enough for adult fingers to reach every key without accidentally depressing adjacent keys to the desired key. Additionally, shrinking display screens caused by physically shrinking computing devices make stylus-based input impractical, especially for those people who have trouble reading small type or hitting the correct point on a small screen with a very small stylus.

Other examples of prior art have dispensed with a full alphanumeric keyboard by providing a numeric keyboard in which multiple presses of a given numeric key to generate a specific letter. This type of operating method still imposes a significant size limitation on a device and tends to be slow to use. Furthermore, entry of punctuation and spaces, along with editing requires the user to remember the special functions of the numeric and other keys. However, because of the small size of the display and relatively large number of buttons, there is no way for these devices to show the effect of all of available buttons.

This usability problem is particularly important in miniature computing devices aimed at uses in telematics applications, key chains, and watches. These devices are typically aimed at broad consumer markets and thus require easy and intuitive usability by consumers with minimal experience with such devices and minimal interest in devoting substantial time to learning how to use such devices. One prior art solution is a stylus-based device utilizing handwriting recognition. However, as with keyboards, the need to provide sufficient writing space limits the minimum size of such a device. In addition, as devices become smaller, the stylus itself, which needs to be long enough to be securely held by the user, becomes a limitation on the minimal size of such devices. The stylus is also a liability in terms of the need to carry and secure when not being used. Beyond these size and carrying limitations, stylus-based devices in the prior art have had problems with slow entry of data, and the need in some implementations for the user to learn a variant of the alphabet to allow the device to adequately distinguish between different characters.

An additional means of operating a computing device employed in the prior art is of a wheel device that is rotated to operate. Some implementations include the ability to press the wheel to allow it to also act as a button. However, this potential solution also has its shortcomings. First, the wheel must be placed on the side of a device to be easily rotated, limiting use for applications such as watches where the device is worn rather than held. Further, the wheel mechanism is a liability in terms of device lifespan the protruding portion of the wheel is easily damaged when dropped or bumped. Finally, while the use of a wheel to navigate through lists of data or functions is reasonably intuitive, the rotating wheel is unintuitive to use for other input operations. More importantly, because a wheel is easily rotated off the desired selection, use of the wheel requires that the user maintain eye contact with the device while using to ensure that desired navigation has occurred. This has obvious disadvantages in low light and driving applications.

What is needed to allow further miniaturization of computing devices is an operating method that does not place a substantial inherent limit on miniaturization and that requires only a minimal time investment to learn how to use.

SUMMARY OF THE INVENTION

An operating method for a miniature computing device should optimally use a minimum number of buttons or other input means to receive user input to allow device to remain small in size. A visual display device such as an LCD display should provide constant feedback to the user as to the changing function of these buttons, individually or in combination thereby providing the user with means of conventual navigation of the various screens and operations of the device. Furthermore, the optional addition of a means of voice input to supplement the minimal button set simplifies input of additional data while also enabling usage in situations, such as driving, with a little physical or eye contact required.

The present invention addresses the problems described above by providing an operating method for a miniature computing device. In accordance with the invention, the miniature computing device provides at least two buttons and a visual display device. A unique visual indicium is used to indicate each button or button combination on the visual display and the corresponding function of that button or combination. A different function of the device is thereby performed in response to pressing one or both of these buttons. An additional visual indicator may be used to signify that holding both buttons for a predetermined period of time results in the device performing a fourth function in response.

A further problem addressed by the present invention is navigation through large volumes of textual data that may be stored on a miniature computing device as in a personal contact or address database. While this data may be acquired by the miniature computing device by synchronization or download from another computer or sharing of virtual business cards, "vcards," between different miniature computing devices, navigation through the resulting large database of data records can be quite tedious. Prior art methods provide wheels to scroll through data items, or repeated key presses to simulate entry of letter data (e.g. pressing the "2" key of a telephone keypad 3 times to enter a "C"). However, these methods are obviously very tedious for large databases and are particularly poorly suited to telematics applications.

In the operating method of the present invention, an additional third button or means to input voice commands may be provided which is used to control voice input to enable storing of a vocal input in association with a displayed screen or data item and to enable direct navigation to that associated screen upon later input of substantially the same vocal input. Thus, for example, simply by stating a contact's name, the miniature computing device can jump immediately to displaying that persons contact information, or in an alternative embodiment, a map to that persons home.

BRIEF DESCRIPTION OF THE DRAWINGS

The features, objectives, and advantages of the invention will become more apparent from the detailed description set forth below when taken in conjunction with the drawings wherein like parts are identified with like reference numeral throughout and wherein:

FIG. 2 is a table that illustrates an embodiment of a set of visual indicia used to associate a button combination with a function.

FIG. 3 illustrates a device display according to an exemplary embodiment of the operating method of the present invention.

FIG. 4 illustrates another device display according to an exemplary embodiment of the operating method of the present invention

DETAILED DESCRIPTION OF THE INVENTION

Figure 1:
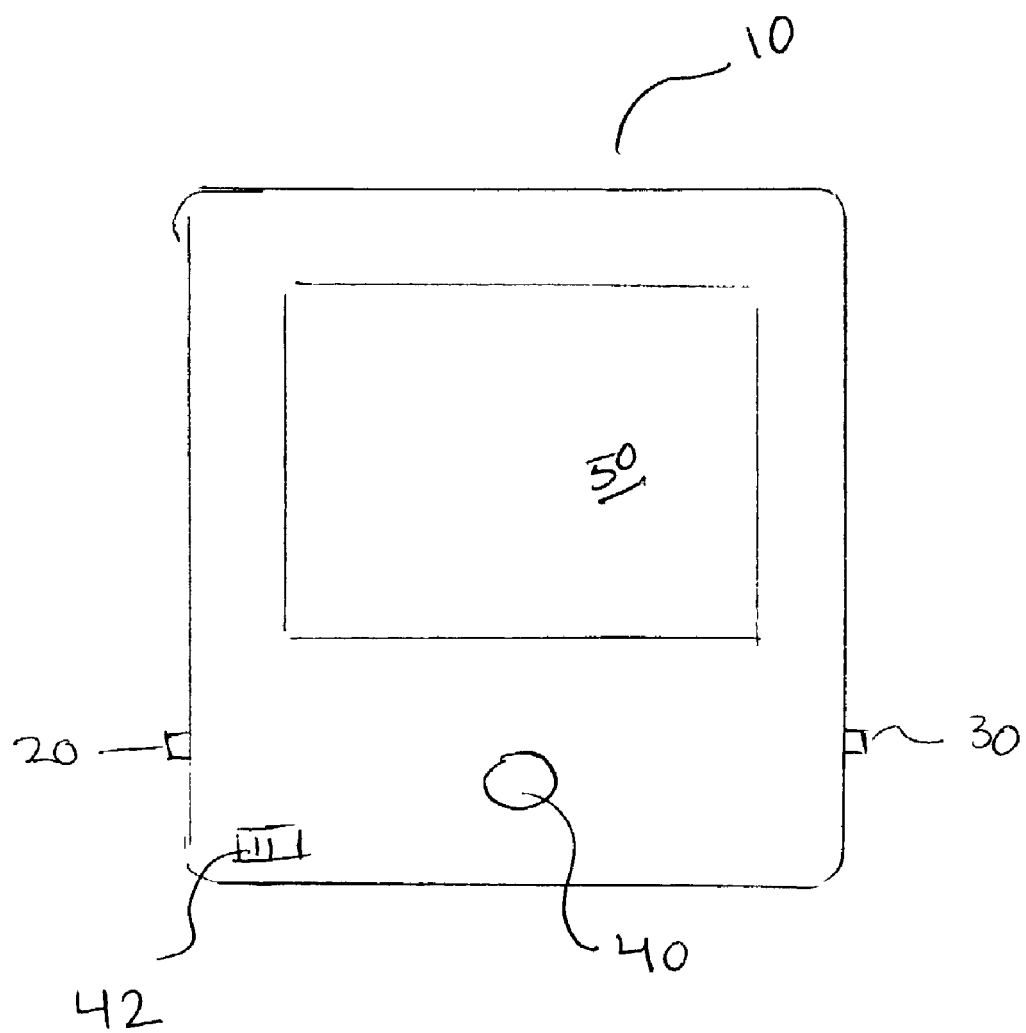
FIG. 1 illustrates a simple miniature computing device utilizing the operating method according to the present invention.

FIG. 1 illustrates a simple miniature computing device 10 which utilizes an operating method according to an embodiment of the present invention. Simple electronic switches operated by depressing a button are utilized in the current best embodiment because they can be easily recessed to prevent accidental activation and damage in day to day use. FIG. 1 depicts a typical miniature computing device 10 having a plurality of button means for data input in the form of a first or left button 20, a second or right button 30, and in the current best embodiment, a third button or voice button 40 along with a means for visual display in the form of a liquid crystal display or LCD display 50. Sound or voice input may be provided by a conventional microphone 42 in the main body of the device 10 or communicating with the device 10 via a wired or wireless link.

A unique visual indicium is used to provide contextual navigation to the user in that the current function or functions of each button or button combination is depicted on the visual display 50. Using this contextual navigation, the functionality of the device 10 is greatly increased because the user, with only two buttons, is given four different choices of action which are all depicted on the display 50. As depicted in figure two, along with the display of data on a screen or a change in screen data, a set of two circles are continually depicted on the display 50 for the user as a contextual guide to provide real time information on the input function that is accomplished by the pushing of one or a combination of both buttons 20 and 30. While depicted as circles, those skilled in the art can readily discern that other shapes might be used such as squares or triangles and such is anticipated. As best shown in FIG. 2, a graphical rendition of up to four different button depressions and their respective functions are related to the user by the showing of the circles filled or not, to indicate one or both buttons being depressed, along with brackets to indicate holding the buttons down for a longer period of time.

FIG. 3 shows the use of these visual indicia in an exemplary embodiment of an address categorization function. The visual indicia are shown in FIG. 3 in combination with letters or other symbols to show the result of input by the user of any of each button combination within the categorization function. The angled up arrow 60 along with the indicator for both buttons held down signifies that the device will display the previous screen. The both buttons pressed indicator along with "SLECT" 70 signifies that pressing both buttons (without holding) will select the currently highlighted category and navigate to the resulting screen. The visual indicia for pressing either the left or right button along with an up 80 or down arrow 90 respectively, signifies navigation up or down through the list of categories. When one of the button combinations corresponding to a displayed visual indicium is activated by pressing the appropriate button(s), the miniature computing device performs the indicated function. Thus in the embodiment depicted in FIG. 3, when the business category is highlighted and both buttons are briefly simultaneously depressed, the computing device performs the related function, e.g. displaying a list of business related contacts.

The function performed by the various button combinations may change based on the context of overall activity that is being performed by the device. As is obvious to those skilled in the art, the exact function of any of the easily accomplished possible four inputs from the two buttons can change depending on the software employed and the use of the herein disclosed contextual navigation using only two buttons and an optional voice input for a multitude of different software input is anticipated. FIG. 4 shows a related embodiment of the present invention wherein the same non-textual component of the visual indicia as in FIG. 3 is accompanied by different text to construct visual indicia for different functions. In FIG. 4, for instance, pressing both buttons performs a function related to finding an address entry rather than selecting a category as in FIG. 3. The present invention thus allows these different functions to be performed by the miniature computing device using the minimal control set of two buttons without requiring the user to learn anything beyond how, in this embodiment, the four simple visual indicia relate to the physical button controls of the device.

Figure 5:
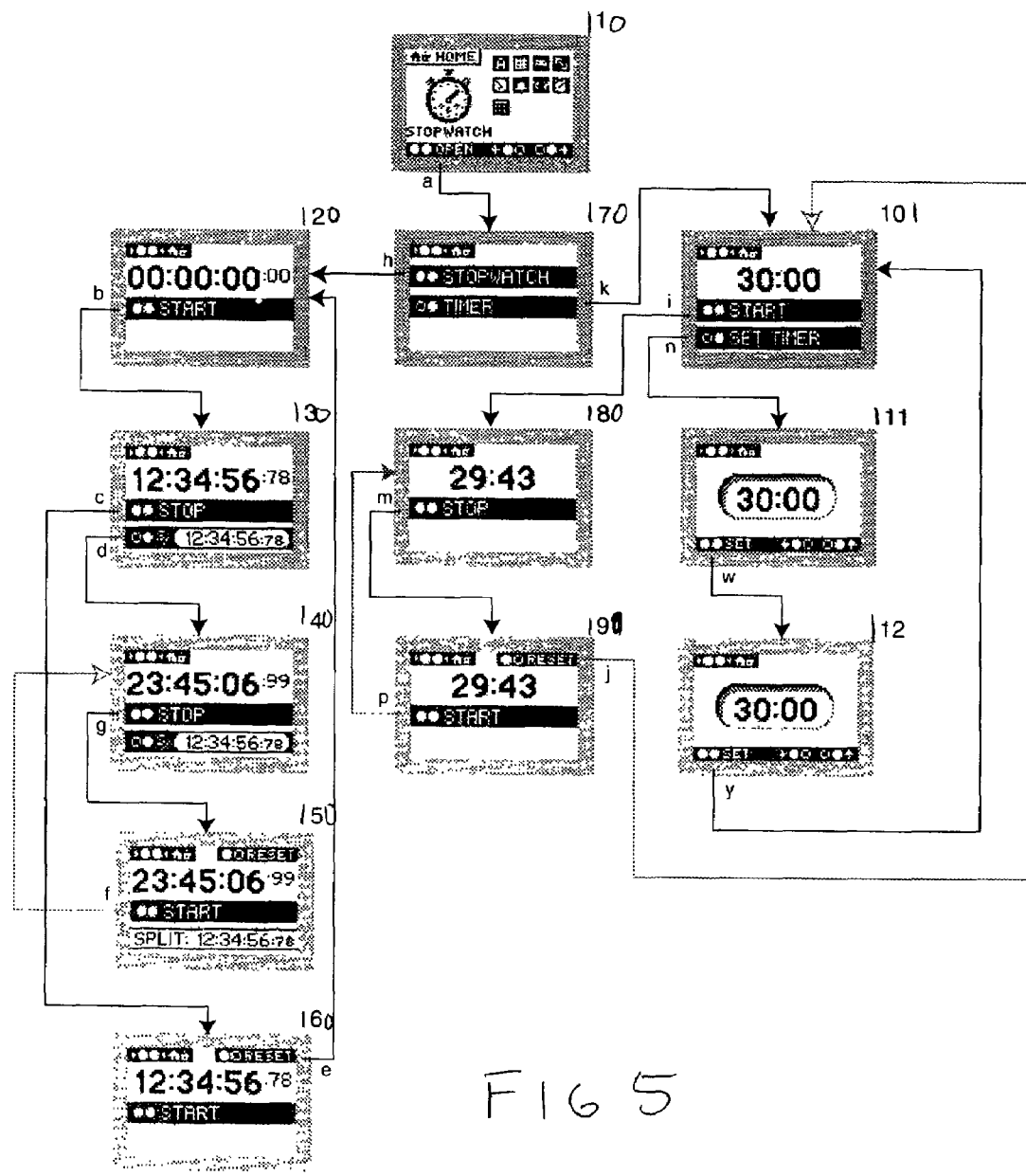
FIG. 5 is a flow diagram showing an exemplary embodiment of the operating method according to the present navigation which provides stopwatch functionality.

An embodiment of the operating method according to the present invention is illustrated by the flow diagram of FIG. 5. At step 110 in the diagram, the stopwatch function is displayed along with indicia for showing that pressing both buttons opens the stopwatch application, the left or right buttons pressed alone, navigate sequentially through other applications, e.g. an address book, a date book, etc. Following the activation of the stopwatch application by the user pressing both buttons simultaneously, the display depicted at 170 allows the user to press and hold both buttons to go back, press both quickly to perform the functions associated with the stopwatch activity, or press only the right button to perform simple timer functions. Pressing both buttons briefly causes the depiction of 120 to be displayed. At this screen, pressing both buttons causes the function related to starting the stopwatch to be performed and for the screen related to controlling the running stopwatch 130 to be displayed. At screen 130, pressing both buttons simultaneously causes the function related to stopping the stopwatch to be performed. Pressing only the right button causes the stopwatch function relating to "split" time to be performed. At any time both buttons may be pressed and held to return to a "Home" screen, as is indicated by the visual indicium in the upper left corner of the display of step 120.

Figure 6:
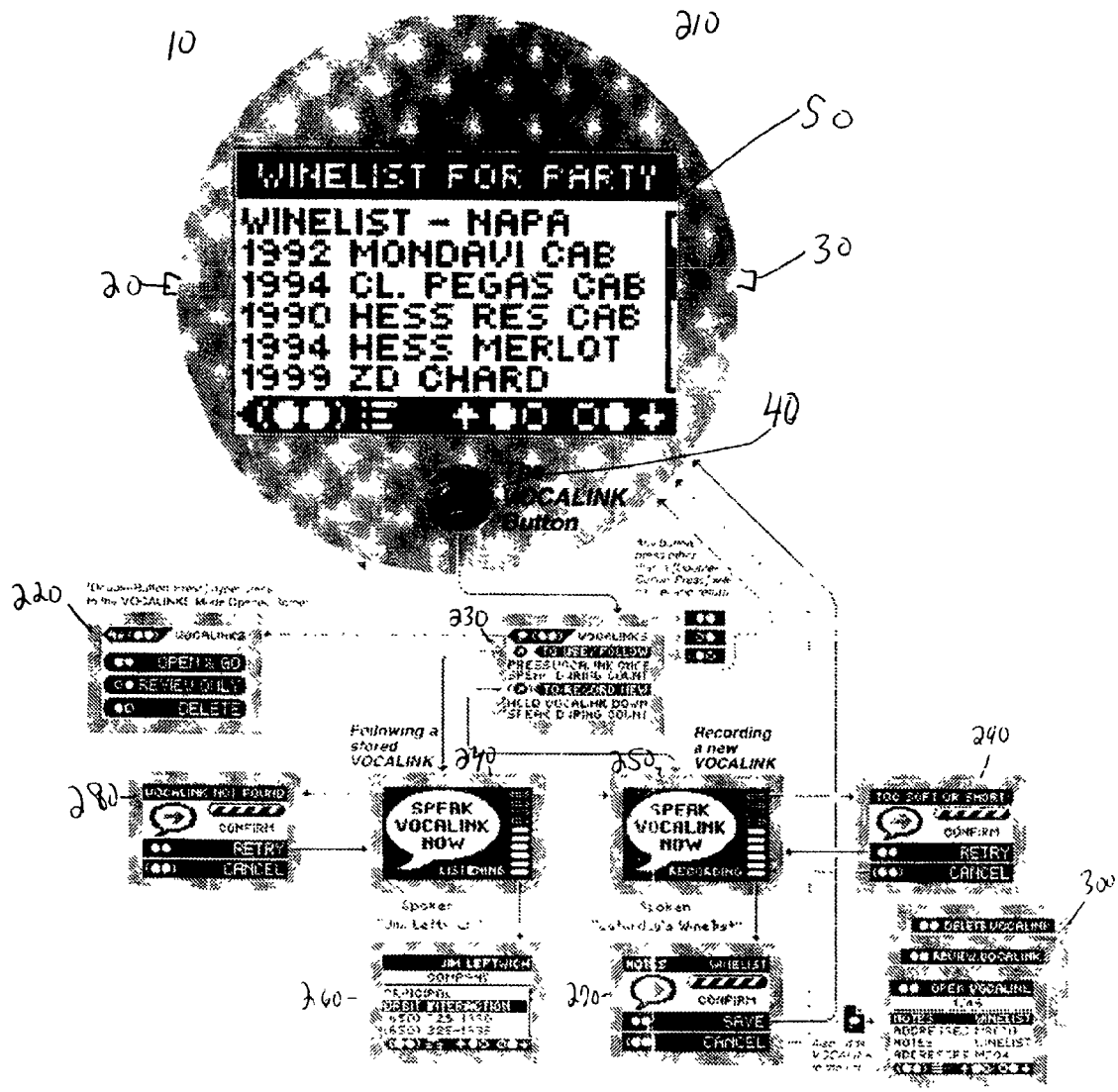
FIG. 6 is a flow diagram showing an embodiment of navigation, including by voice, according to the present invention.

Some embodiments of the present operating method may also provide for navigation using the addition of voice input of voice commands to display a screen that has previously been associated with that specific voice input. FIG. 6 depicts a flow diagram illustrating an embodiment of the operating method of the present invention which includes these additional voice input association functions. As an example of how a voice input can be added to the simple two button operating system to further its utility, at the screen of depicted at 210, a wine list is displayed, along with the visual indicia for navigation through the list using the elements of the operating method described above. Upon the press of a third button, the vocalink button 40, the function is performed which displays the vocalinks instruction screen 230. Holding down the vocalink button 40 causes the function for following a vocalink to be performed. This results in the display at 240 requesting the user to input the vocalink to be followed. The embodiment illustrated in 240 also shows a countdown of time via a graphical indicator, but other embodiments may use a numeric indicia, audible feedback such as a tone, or any similar means to indicate to the user that the miniature computing device is awaiting vocal input. The required vocal input may be obtained, for example, via an electronic microphone in the housing of the miniature computing device or by one connected through a wire or set of wires, or wirelessly using an RF mechanism such as Bluetooth where the user simply states a voice command which is communicated to the device 10.

The device 10 may accept the voice input in conjunction with the vocalink button 40 during depression of this third button, for a determined period after depression of the vocalink button 40, or for a period of time following depression that is substantially equal to the depression time of the vocalink button 40. Or combinations of this timing could be combined to allow for vocal input and then confirmation or search activation for a match between the input voice command and a particular page of data. After the vocal input is complete, the vocal command so input is processed. One embodiment of the vocal input processing is voice recognition wherein the voice input is converted to corresponding text or phonetic data or a digital representation of the voice command and stored in the memory of the device 10. In other embodiments, other representations of the vocal input data may be stored, such as minimally processed PCM data or compressed data using the voice coding techniques utilized by mobile telephones. The voice command is thus converted to a format that may be stored in memory of the device 10 and associated with a display page for later retrieval when the voice command is repeated and input.

As further depicted in FIG. 6, in an embodiment of the device 10 having software that stores personal information in a database, the vocal input in the form of the communicated voice command is compared to other stored vocal inputs and matched to that of a person. If no match is found, a function may be performed to provide the user with an opportunity to retry vocal entry 280. In the example shown in FIG. 6, the voice input matches that of one previously associated with a personal contact entry of that person. Following a match, the miniature computing device displays this a screen with the selected contact 260.

When the voice entry function is selected at 230, the recording function is performed resulting in the display 250. The voice input is received here as was described previously. When voice input is completed, a final confirmation 270 is displayed. If the save function is selected, the voice input is stored in memory and associated with a particular display 210. This vocalink may by traversed at a later time following the method as shown in 230 and 240 wherein the user would simply repeat entering the voice command that was associated earlier with a particular entry and thus a user may "jump" to a particular display screen which is associated to the particular voice command that has been stored in memory and associated with that particular page of data.

While all of the fundamental characteristics and features of the operating Method for Miniature Computing Devices have been described herein, with reference to particular embodiments thereof, a latitude of modification, various changes and substitutions are intended in the foregoing disclosure and it will be apparent that in some instance, some features of the invention will be employed without a corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention defined herein.

What is claimed is:

1. In combination with a miniature computing device having a processor, memory, software, at least two button means for input, and a visual display device, the method comprising:

providing a first visual indicator on the visual display device which indicates a first function that is to be performed by the computing device if only a first button is pressed;

providing a second visual indicator on the visual display device which indicates a second function that is to be performed by the computing device if only a second button is pressed;

providing a third visual indicator on the visual display device which indicates a third function that is to be performed by the computing device if said first button and said second button are both pressed simultaneously;

sensing which buttons are pressed;

performing the first function on the computing device if the first button is pressed;

performing the second function on the computing device if the second button is pressed; and performing the third function on the computing device if the first button and the second button are both pressed simultaneously.

2. The method of claim 1, further comprising:

providing a fourth visual indicator on the visual display device which indicates a fourth function that is to be performed by the computing device if the first and second button are both pressed and held for a predetermined period of time;

performing the fourth function on the computing device if the first button and the second button are both pressed and held for said predetermined period of time.

3. The method of claim 1, further comprising:

communicating a voice command from a user to said miniature computing device;

associating said voice command with a particular display stored in said memory of said miniature computing device;

storing the association between said voice command and said particular display screen in said memory; and moving directly to said particular display screen upon subsequent input of said voice command to said miniature computing device.

4. The method of claim 3, further comprising:

pushing a third button following said communicating of said voice command from said user to said miniature computing device to activate a search for said association between said voice command and said particular display screen in said memory; and displaying said particular display screen should said search yield said association between said voice command and said particular display screen be stored in memory.

5. The method of claim 2, further comprising:

communicating a voice command from a user to said miniature computing device;

associating said voice command with a particular display stored in said memory of said miniature computing device;

storing the association between said voice command and said particular display screen in said memory; and moving directly to said particular display screen upon subsequent input of said voice command to said miniature computing device.

6. The method of claim 5, further comprising:

pressing a third button in conjunction with said communicating of said voice command from said user to said miniature computing device;

searching for said association between said voice command and said particular display screen in said memory; and displaying said particular display screen should said search yield said association between said voice command and said particular display screen be stored in memory.

7. The method of claim 1, wherein in said first and second functions to be performed are navigation to a different screen.

8. The method of claim 1, wherein in said third function to be performed is navigation to a the previous screen.

9. The method of claim 7, wherein in said third function to be performed is navigation to a the previous screen.

10. The method of claim 1, wherein said first, second, and third visual indicators include a graphical icon.

* * * * *